United States Patent
Agarwal et al.

(10) Patent No.: US 10,148,595 B2
(45) Date of Patent: Dec. 4, 2018

(54) HANDLING DYNAMIC PORT/LAG CHANGES WITHOUT BREAKING COMMUNICATION IN AN EXTENDED BRIDGE

(71) Applicant: ARRIS Enterprises LLC, Suwanee, GA (US)

(72) Inventors: Bipin Agarwal, San Jose, CA (US); Kwun-Nan Kevin Lin, Saratoga, CA (US); Venkata Gopi Ravi Kumar Pedaprolu, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/286,472

(22) Filed: Oct. 5, 2016

(65) Prior Publication Data

US 2017/0111296 A1    Apr. 20, 2017

Related U.S. Application Data

(60) Provisional application No. 62/242,709, filed on Oct. 16, 2015.

(51) Int. Cl.
*H04L 12/935* (2013.01)
*H04L 12/751* (2013.01)
(Continued)

(52) U.S. Cl.
CPC .............. *H04L 49/30* (2013.01); *H04L 45/02* (2013.01); *H04L 45/60* (2013.01); *H04L 45/66* (2013.01); *H04L 9/0872* (2013.01)

(58) Field of Classification Search
CPC ......... H04L 49/30; H04L 45/02; H04L 45/60; H04L 45/66; H04L 9/0872
See application file for complete search history.

(56) References Cited

U.S. PATENT DOCUMENTS 6,463,479 B1 * 10/2002 Jennings ................ H04L 12/46
370/246
6,801,950 B1 * 10/2004 O'Keeffe ................ H04L 45/00
370/389

(Continued)

FOREIGN PATENT DOCUMENTS

| EP | 2696538 A1 | 2/2014 |
| WO | 2017062671 A1 | 4/2017 |
| WO | 2017070587 A1 | 4/2017 |

OTHER PUBLICATIONS

U.S. Appl. No. 15/489,395, filed Apr. 17, 2017 by Kwun-Nan Kevin Lin (Unpublished.).

(Continued)

*Primary Examiner* — Warner Wong
(74) *Attorney, Agent, or Firm* — Stewart M. Wiener

(57) ABSTRACT

Techniques for handling dynamic cascade port/LAG changes without breaking communication in an extended bridge are provided. According to one embodiment, a first network device (e.g., controlling bridge) in a system of network devices (e.g., extended bridge) can receive a command relating to a change to at least one port or LAG of the system. The first network device can then transmit change messages to one or more other network devices (e.g., port extenders) in the system that are affected by the change, where the change messages are transmitted in an order based on the distance of each of the one or more other network devices from the first network device.

18 Claims, 3 Drawing Sheets

(51) Int. Cl.
   *H04L 12/773*   (2013.01)
   *H04L 12/721*   (2013.01)
   *H04L 9/08*     (2006.01)

(56) References Cited

U.S. PATENT DOCUMENTS

| | | | |
|---|---|---|---|
| 6,950,855 | B2 | 9/2005 | Sampathkumar |
| 7,558,835 | B1 | 7/2009 | Shafer |
| 7,675,869 | B1 | 3/2010 | Anker et al. |
| 7,936,770 | B1 * | 5/2011 | Frattura ............... H04L 49/90 370/351 |
| 9,231,860 | B2 * | 1/2016 | Kotha ................ H04L 45/245 |
| 9,641,249 | B2 * | 5/2017 | Kaneriya ............. H04B 10/25 |
| 9,755,895 | B2 * | 9/2017 | Velayudhan ........ H04L 41/0806 |
| 2005/0078610 | A1 * | 4/2005 | Previdi ............... H04L 45/02 370/254 |
| 2007/0019652 | A1 * | 1/2007 | Shand ................ H04L 45/02 370/395.21 |
| 2011/0268118 | A1 * | 11/2011 | Schlansker ......... H04L 12/4641 370/392 |
| 2012/0275297 | A1 * | 11/2012 | Subramanian ....... H04L 45/245 370/225 |
| 2012/0287785 | A1 * | 11/2012 | Kamble ............... H04L 49/356 370/230.1 |
| 2013/0322457 | A1 * | 12/2013 | Budhia ................ H04L 49/253 370/401 |
| 2014/0156906 | A1 * | 6/2014 | Babu .................. G06F 13/4022 710/316 |
| 2014/0181275 | A1 | 6/2014 | Lin et al. |
| 2014/0254604 | A1 * | 9/2014 | Janardhanan ......... H04L 45/18 370/401 |
| 2014/0269710 | A1 * | 9/2014 | Sundaram ............ H04L 45/302 370/392 |
| 2016/0065463 | A1 * | 3/2016 | Wang .................. H04L 49/70 370/392 |
| 2017/0085488 | A1 | 3/2017 | Bhattacharya et al. |
| 2017/0093628 | A1 | 3/2017 | Lin et al. |
| 2017/0099215 | A1 * | 4/2017 | Arumugam .......... H04L 45/245 |
| 2017/0104626 | A1 | 4/2017 | Lin et al. |
| 2017/0104665 | A1 | 4/2017 | Gowthaman |
| 2017/0104694 | A1 | 4/2017 | Lin et al. |
| 2017/0118041 | A1 | 4/2017 | Bhattacharya et al. |
| 2017/0118042 | A1 | 4/2017 | Bhattacharya et al. |
| 2017/0302577 | A1 * | 10/2017 | Worth ................. H04L 45/7453 |

OTHER PUBLICATIONS

Cisco Nexus 5600 Series NX-OS Layer 2 Switching Configuration Guide, Release 7.x; Mar. 15, 2014; Cisco Systems, Inc.; 280 pages.
Configuring the Fabric Extender, Chapter 2; Cisco Nexus 2000 Series Fabric Extender Software Configuration Guide; 16 pages.
Configuring Port Extender Stack; Dell Networking C9010/C1048P; Jan. 30, 2017; https://qrl.dell.com/Files/enus/Html/C9010_C1048P/Configuring%20PE%20Stack.html; 3 pages.
Understanding Junos Fusion Provider Edge Components; Technical Documentation—Support—Juniper Networks; Mar. 31, 2017; 5 pages; https://www.juniper.net/documentation/en_US/junos/topics/concept/fusion-components.html.
U.S. Appl. No. 15/595,747, filed May 15, 2017 by Bipin Agarwal (Unpublished.).
U.S. Appl. No. 15/229,012, filed Aug. 4, 2016 by Lin et al (Unpublished.).
U.S. Appl. No. 15/243,782, filed Aug. 22, 2016 by Ramesh Gowthaman (Unpublished.).
U.S. Appl. No. 15/272,218, filed Sep. 21, 2016 by Somen Bhattacharya (Unpublished.).
U.S. Appl. No. 15/276,579, filed Sep. 26, 2016 by Kwun-Nan Kevin Lin et al. (Unpublished.).
U.S. Appl. No. 15/276,619, filed Sep. 26, 2016 by Kwun-Nan Kevin Lin et al. (Unpublished.).
Cisco IOS Command Modes; http://www.cisco.com/c/en/us/td/docs/ios/12_2/configfun/configuration/guide/ffun_c/fcf019.html#wp1000922; Mar. 25, 2016; 20 pages.
Dell C9010 Module Switch Interoperability with Cisco Catalyst 3750, A Development Guide for Dell Networking Switches (v1.0), Dell Network Solutions Engineering, Sep. 2015, 24 pages.
Dell Networking C1048P Getting Started Guide, Sep. 2015, 26 pages.
Juniper Networks, Junos Fusion Provider Edge, Release 14.2R4, Feb. 17, 2016, 646 pages.
Cisco StackWise and StackWise Plus Technology, 2016 Cisco, Mar. 25, 2016, 11 pages.
Dell Stack Master Election, Dell Networking Configuration Guide for the C9000 Series Version 9.9 (0.0), Mar. 25, 2016, 1 page.
International Search Report and Written Opinion for International Appln. No. PCT/US2016/055827 dated Jan. 25, 2017, 15 pages.
Virtual Bridged Local Area Networks-Bridge Port Extension, IEEE Computer Society, IEEE Std 802.1 BR-2012, Jul. 16, 2012, 121 pages.
Brocade FastIron Switch Port Extender, Configuration Guide, Supporting FastIron Software Release 8.0.40, Feb. 29, 2016, 88 pages.
International Search Report and Written Opinion for International Appln. No. PCT/US2016/058283 dated Feb. 17, 2017, 12 pages.
Lockwood et al., "Automated Tools to Implement and Test Internet Systems in Reconfigurable Hardware", ACM SIGCOMM Computer Communications Review, vol. 33, No. 3, Jul. 2003, pp. 103-110.
U.S. Appl. No. 15/331,067, filed Oct. 21, 2016 by Somen Bhattacharya et al. (Unpublished.).
U.S. Appl. No. 15/331,160, filed Oct. 21, 2016 by Somen Bhattacharya et al. (Unpublished.).
Dell Networking Configuration Guide for the C9000 Series, Version 9.9 (0.0), Oct. 2015, 1148 pages.

* cited by examiner

HANDLING DYNAMIC PORT/LAG CHANGES WITHOUT BREAKING COMMUNICATION IN AN EXTENDED BRIDGE

CROSS-REFERENCES TO RELATED APPLICATIONS

The present application claims the benefit and priority of U.S. Provisional Application No. 62/242,709, filed Oct. 16, 2015, entitled "Handling Multiple Simultaneous Upstream Ports for Port Extenders." The entire contents of this application are incorporated herein by reference in its entirety for all purposes.

BACKGROUND

An IEEE 802.1BR-based network topology (also known as an extended bridge) is a logical network entity that comprises two different types of units: a controlling bridge (CB) unit and one or more port extender (PE) units. The CB serves as the controller of the extended bridge and is responsible for performing control plane functions (e.g., Layer 2 switching, Layer 3 routing, etc.) with respect to network traffic passing through the bridge. In contrast the PEs, which connect to the CB and to other devices/hosts external to the extended bridge, act as non-intelligent devices and thus do not perform any local switching or routing; instead, their primary function is to provide additional data port terminations for the CB (thereby extending the port capacity of the CB). For example, each PE may be a switch/router with X number of physical data ports, which appear as virtual data ports on the CB. Upon receiving a data packet from an external device/host on an ingress data port, the PE forwards the data packet to the CB, which processes the data packet in hardware or software to determine an appropriate egress port through which the packet should be sent out. The CB then forwards the data packet to the PE housing the egress port for transmission through that port towards the next hop destination.

In some cases, an extended bridge may support multiple CBs which connect to each other according to a linear or ring topology. In these cases, one CB may be selected as the "master" CB of the extended bridge and serve as the central point of management for the entire bridge. Other CBs may operate in a "standby" or "member" mode.

The links that interconnect the PEs to each other and to the CB in an extended bridge are known as cascade links. Each cascade link comprises, at its endpoints, an upstream port (i.e., a port that provides connectivity towards the CB) and a downstream port (i.e., a port that provides connectivity down a PE chain). These upstream and downstream ports are collectively referred to herein as "cascade ports" of the cascade link. Generally speaking, cascade links are considered internal to the extended bridge since they only carry data traffic that has been tagged with a special ETAG header that is understood by the PEs and the CB. This ETAG header facilitates the internal routing of data traffic from an ingress PE to the CB for processing, as well as from the CB to the egress PE(s) that will forward traffic out of the extended bridge.

In order to properly handle ETAG traffic, the physical cascade ports at the endpoints of a cascade link need to be configured to operate in an ETAG-enabled mode instead of a conventional data port mode. This configuration is typically performed via an LLDP (Link Layer Discovery Protocol) based exchange between the CB and a given PE at the time the PE joins the extended bridge, and may be updated in response to dynamic port changes that are made during system runtime. In the past, each endpoint of a cascade link has generally been limited to being a single cascade port. However, in new emerging 802.1BR implementations, each endpoint of a cascade link may be a link aggregation group (LAG) that comprises multiple physical ports but is treated as a single logical port. In these cases, the cascade link may also be referred to as a cascade trunk. With these new implementations, novel techniques are needed to manage the configuration and reconfiguration of such LAGs.

SUMMARY

Techniques for handling dynamic cascade port/LAG changes without breaking communication in an extended bridge are provided. According to one embodiment, a first network device (e.g., controlling bridge) in a system of network devices (e.g., extended bridge) can receive a command relating to a change to at least one port or LAG of the system. The first network device can then transmit change messages to one or more other network devices (e.g., port extenders) in the system that are affected by the change, where the change messages are transmitted in an order based on the distance of each of the one or more other network devices from the first network device.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for managing cascade LAGs (i.e., LAGs at the endpoints of a cascade link/trunk) in an 802.1BR-based extended bridge.

According to one set of embodiments, these techniques include a workflow for handling dynamic cascade port/LAG changes in the extended bridge in a manner that avoids permanent breaks in communication between the CBs/PEs of the bridge. This workflow operates by enforcing a specific order of change message transmissions from the CB to the PEs affected by the changes. The types of cascade port/LAG changes that can be handled via this workflow include, e.g., the addition of one or more new ports to the endpoints of a cascade link/trunk and the deletion of one or more ports from the endpoints of a cascade link/trunk.

According to another set of embodiments, the techniques of the present disclosure include validations that can be performed by the CB of an extended bridge for verifying the bridge's topology at the time a PE joins the bridge. With these validations, the CB can detect invalid LAGs and/or LAG misconnections in the topology and generate appropriate error messages for informing a user/administrator of the problems.

The foregoing and other aspects of the present disclosure are described in further detail in the sections that follow.

2. Example Extended Bridge and Switch/Router Architecture

Figure 1:
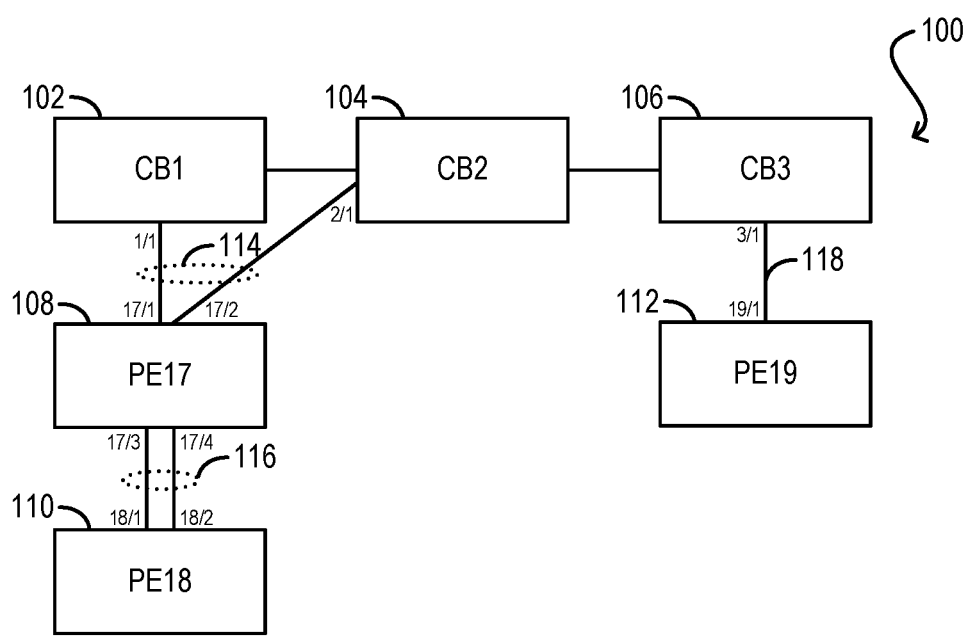
FIG. 1 depicts an example extended bridge according to an embodiment.

FIG. 1 depicts an extended bridge 100 in which embodiments of the present disclosure may be implemented. As shown, extended bridge 100 includes three CBs 102, 104, and 106 (identified as CB1, CB2, and CB3) that are connected to each other to form a CB core stack. Each CB may be implemented using a relatively high-end switch/router that is capable of handling control plane functions (e.g., L2 forwarding, L3 routing, bridge management, etc.) for the entirety of extended bridge 100. For example, in one embodiment, each CB may be a high-cost, modular chassis-based switch/router.

Extended bridge 100 also includes three PEs 108, 110, and 112 (identified as PE17, PE18, and PE19) that are connected to the CBs and/or each other via cascade links 114, 116, and 118. Unlike the CB s, the PEs may be implemented using relatively lower-end switches/routers that are sufficient for carrying out PE functions as defined in the IEEE 802.1BR standard. For instance, in one embodiment each PE may be a lower-cost, "pizza box" style fixed-form factor switch/router.

In the example of FIG. 1, cascade link 114 between PE 108 (PE17) and CBs 102 and 104 (CB1 and CB2) is a cascade trunk comprising two physical links. On the side of PE17, these two physical links are connected to a 2-port LAG comprising upstream ports 17/1 and 17/2. On the side of CB1 and CB2, the two physical links are connected to singular downstream ports 1/1 and 2/1 on CB1 and CB2 respectively. This configuration provides a measure of redundancy since PE17 (and downstream PE18) can communicate with the CB core stack using either physical link.

Cascade link 116 between PE 108 (PE17) and PE 110 (PE18) is also a cascade trunk comprising two physical links. One the side of PE17, these two physical links are connected to a 2-port LAG comprising downstream ports 17/3 and 17/4. On the side of PE18, the two physical links are connected to a 2-port LAG comprising upstream ports 18/1 and 18/2. Either of the two physical links of the cascade trunk may be used to exchange ETAG traffic between PE17 and PE18.

The other cascade link in extended bridge 100 (i.e., cascade link 118) is a non-LAG link—in other words, a link with a single physical port at each endpoint of the link.

Figure 2:
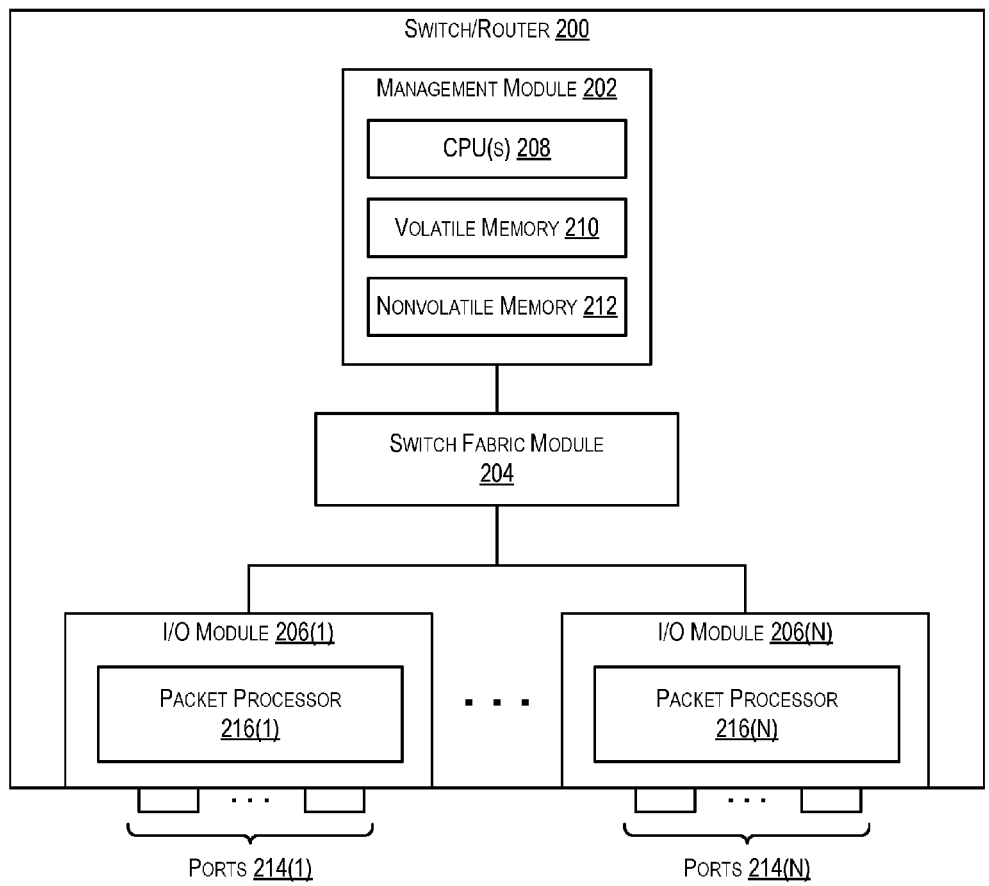
FIG. 2 depicts an example switch/router architecture according to an embodiment.

FIG. 2 depicts the architecture of an example switch/router 200 that may be used to implement the CBs or PEs of FIG. 1 according to an embodiment. As shown in FIG. 2, switch/router 200 comprises a management module 202, a switch fabric module 204, and one or more I/O modules 206(1)-(N). Management module 202 includes one or more management CPUs 208 for managing/controlling the operation of switch/router 200. Each management CPU 208 can be a general purpose processor, such as a PowerPC, Intel, AMD, or ARM-based processor, that operates under the control of software stored in an associated volatile memory (e.g., RAM) 210 and/or nonvolatile memory (e.g., ROM, flash memory, etc.) 212.

Switch fabric module 204 and I/O module(s) 206(1)-(N) collectively represent the data, or forwarding, plane of switch/router 200. Switch fabric module 204 is configured to interconnect the various other modules of switch/router 200. Each I/O module 206(1)-(N) includes one or more ports 214(1)-(N) that are used by switch/router 200 to send and receive data packets to/from other networks/hosts, as well as to/from other units within extended bridge 100 of FIG. 1. Each I/O module 206(1)-(N) also includes a packet processor 216(1)-(N) that can make wire speed decisions on how to handle incoming or outgoing data packets.

As noted in the Background section and as depicted in FIG. 1, some emerging 802.1BR implementations support the use of LAGs, rather than singular ports, to form internal PE-to-PE or PE-to-CB connections. However, managing the configuration of such LAGs can be challenging. For example, in certain scenarios a user may attempt to make changes to the ports/LAGs of a live cascade link/trunk during system runtime, such as adding one or more ports to each endpoint LAG or removing one or more ports from each endpoint LAG. If these changes are not handled properly, communication over that cascade link/trunk may be broken on a permanent basis. As another example, at the time a user connects a new PE to an extended bridge via one or more LAGs, the user may inadvertently misconnect one or more ports of the LAG(s), resulting in an invalid bridge topology.

To address these and other similar issues, switch/router 200 of FIG. 2 can be enhanced to support novel LAG management techniques when operating as a CB in an extended bridge, such as CB 102 of FIG. 1. These techniques can be implemented via, e.g., program code that is executed by management CPU(s) 208, and/or via one or more new hardware modules that are added to switch/router 200 (not shown). As described in further detail below, the LAG management techniques of the present disclosure include techniques that enable the CB to (1) execute dynamic cascade port/LAG changes with respect to a live cascade link/trunk without breaking PE-to-PE or PE-to-CB communication, and (2) validate the topology of the extended bridge (and in particular, LAG connections) at the time a PE joins the bridge. Thus, with these features, the CB can handle cascade LAG configuration and reconfiguration in a robust manner.

It should be appreciated that FIGS. 1 and 2 are illustrative and not intended to limit embodiments of the present disclosure. For example, although FIG. 1 depicts a particular topology for extended bridge 100, any other type of topology may be used. Further, the various entities shown in FIGS. 1 and 2 may have additional subcomponents or functions that are not described. One of ordinary skill in the art will recognize many variations, modifications, and alternatives.

3. Handling Dynamic Port/LAG Changes without Breaking Communication

In certain 802.1BR implementations, the CB in an extended bridge may expose a user interface (e.g., one or more CLI commands) that allows users to make dynamic changes to one or more cascade ports/LAGs at the endpoints of a live cascade link/trunk during system runtime. One example of such a CLI command is the "multi-spx-lag" command exposed by 802.1BR-compatible switches and routers developed by Brocade Communications Systems, Inc. The types of changes that can be made using this command include, e.g., changing a cascade port into a cascade LAG, changing a cascade LAG into a cascade port, increasing or reducing the number of ports in a cascade LAG, etc.

As mentioned previously, it may be possible for such a change to break communication within the extended bridge if the change is not handled correctly. For example, with respect to extended bridge 100 of FIG. 1, assume a user enters a command at CB1 to change the LAG on PE17 (linking to PE18) from (17/3, 17/4) to (17/3, 17/5) and change the LAG on PE18 from (18/1, 18/2) to (18/1, 18/3). In this scenario, CB1 will send messages to both PE17 and PE18 to reprogram their local LAG configurations in accordance with the user command. However, if PE17 receives its message before PE18, PE17 may make its LAG changes in hardware before PE18 is able to receive its message. If PE17 attempts to forward PE18's change message over the newly added LAG port (i.e., 17/5), the message will never be received by PE18 (since corresponding port 18/3 has not yet been reprogrammed from a data port into a cascade LAG port), resulting in a permanent break in communication between the two units.

Figure 3:
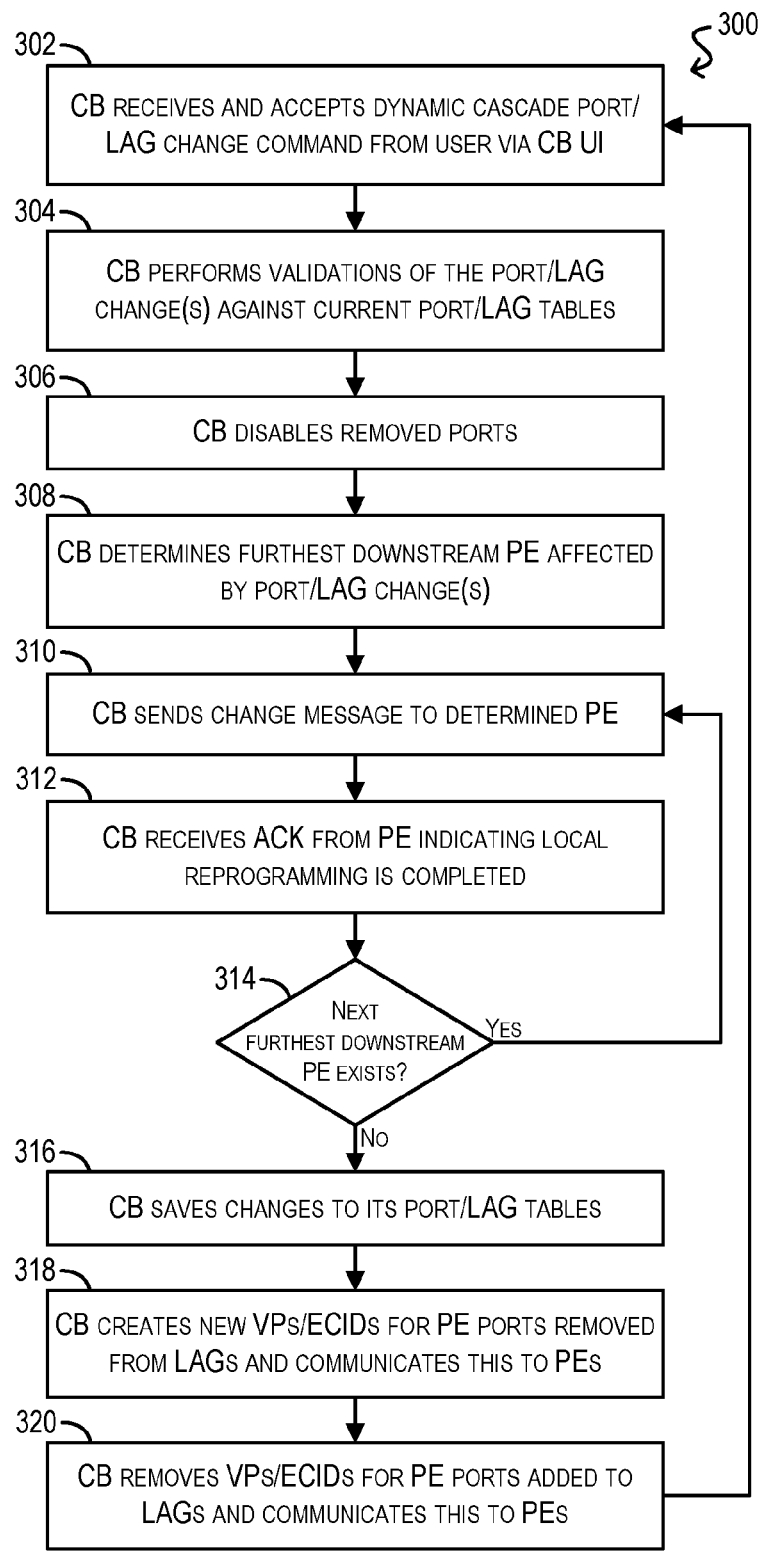
FIG. 3 depicts a workflow that may be executed by a CB in an extended bridge for handling dynamic cascade port/LAG changes according to an embodiment.

To address this, FIG. 3 depicts a workflow 300 that may be executed by switch/router 200 of FIG. 2 (acting as a CB in an extended bridge) for handling dynamic cascade port/LAG changes according to an embodiment. At a high level, this workflow enforces an ordered sequence of change message transmissions from the CB to the PEs affected by the change. This ensures that downstream PEs receives their respective change messages before upstream PEs, and thereby avoids scenarios where the downstream PEs are unable to receive their change messages (which can cause a permanent communication break as described above).

Starting with block 302 of workflow 300, the CB can receive and accept a dynamic cascade port/LAG change command from a user via the CB's UI. In one embodiment, the CB can block the acceptance of any further change commands until processing of the current command has completed (to avoid potential timing issues). Upon receiving the command, the CB can perform one or more validations of the port/LAG change(s) included in the command against the current port/LAG tables maintained by the CB in order to ensure that the change(s) result in a valid port/LAG configuration (block 304). If any of these validations fail, the CB can output an error message or log and can exit the workflow (not shown).

Assuming the validations are successful, the CB can disable, in its port/LAG tables, any ports that are to be removed from a cascade LAG due to the user change command (block 306). This ensures that those ports are not used to carry any data traffic until processing of the change command has been completed.

Then, at blocks 308 and 310, the CB can determine the furthest downstream PE that is affected by the port/LAG change(s) and can send a change message to that PE. If the change is directed to a LAG between the CB and a directed connected PE, the CB can send the change message to that directly connected PE. The change message can include instructions for reprogramming the PE's local cascade port/LAG configuration in accordance with the port/LAG change(s) in the user change command.

Once the downstream PE has received and processed the change message, the CB can receive an acknowledgement from the PE indicating that it has reprogrammed its local ports (block 312). In response, the CB can determine if there is another PE immediately upstream from the last PE (referred to as the "next furthest downstream PE") that is affected by the port/LAG change(s) (block 314). Note that, in the case where the PE is directly connected to the B, there will be no further upstream PEs. If there is another upstream PE, the CB can return to block 310 and send an appropriate change message to that PE. Blocks 310-314 can repeat until the CB has sent change messages to, and received corresponding acknowledgements from, all of the affected PEs according to their distance from the CB (i.e., from furthest to closest).

Upon determining that there are no further PEs affected by the port/LAG change(s), the CB can save the changes to its port/LAG configuration tables (block 316). In addition, at blocks 318 and 320, the CB can (1) create new virtual ports (VPs) for the PE ports that have been removed from LAGs (and thus changed from cascade ports into data ports), (2) assign new E-Channel IDs (ECIDs) to the new VPs and communicate these new ECIDs to each PE in the bridge (so that the PEs can program the ECIDs into their local hardware forwarding tables), (3) remove existing VPs for the PE ports that have been added to LAGs (and thus changed from data ports into cascade ports), and (4) communicate the ECIDs of the removed VPs to each PE in the bridge (so that the PEs can delete the ECIDs from their local hardware forwarding tables). Finally, upon the conclusion of block 320, workflow 300 can return to block 302 so that the CB can receive and accept the next dynamic port/LAG change command from the user.

To clarify the operation of workflow 300, consider the scenario discussed previously with respect to extended bridge 100 of FIG. 1 in which a user enters a command at CB1 to change the LAG on PE17 (linking to PE18) from (17/3, 17/4) to (17/3, 17/5) and change the LAG on PE18 from (18/1, 18/2) to (18/1, 18/3).

In this scenario, CB1 will first determine whether the changes to these LAGs are valid (they are)

CB1 will then disable the ports removed from the PE17 and PE18 LAGs (i.e., ports 17/4 and 18/2) and determine that PE18 is the furthest downstream PE affected by the changes CB1 will send a change message to PE18 to reprogram its LAG from (18/1, 18/2) to (18/1, 18/3) and receive an acknowledgement from PE18 indicating that its local reprogramming is complete CB1 will subsequently determine that PE17 is the next furthest downstream PE affected by the changes CB1 will send a change message to PE17 to reprogram its LAG from (17/3, 17/4) to (17/3, 17/5) and receive an acknowledgement from PE17 indicating that its local reprogramming is complete Upon receiving the acknowledgement from PE17, CB1 will save the LAG changes to its port/LAG configuration tables CB1 will also create new VPs/ECIDs for ports 18/2 and 17/4 (which have been turned into data ports) and remove the existing VPs/ECIDs for ports 18/3 and 17/5 (which have been turned into cascade ports)

Finally, CB1 will communicate the new/removed ECIDs to the PEs in the bridge for local hardware programming It should be appreciated that workflow 300 is illustrative and various modifications are possible. For example, while workflow 300 indicates that the CB waits for and receives an acknowledgement from each PE before sending a change message to the next furthest downstream PE, in some embodiments CB may use a reliable messaging mechanism that ensures each change message is received by each PE within, e.g., a predefined time interval. In these embodiments, the CB may send the next change message to the next furthest downstream PE once the predefined time interval has passed, without receiving an explicit acknowledgement. In other embodiments, the CB may use other known mechanisms for ensuring a strict ordering for the delivery of change messages. One of ordinary skill in the art will recognize many variations, modifications, and alternatives.

4. Topology Validation Upon PE Join

Under the 802.1BR standard, when a PE joins an extended bridge (i.e., is physically attached to the bridge and powered-on for the first time), the PE sends out an LLDP join packet on all of its cascade ports. This LLDP join packet, which is ultimately received by the CB, includes PE configuration information that enables the CB to integrate the PE into the extended bridge, such as PE identifier (ID), egress port, modules types, cascade ports, software image version, etc. If the PE has one or more cascade LAGs configured/programmed on the device at the time of the join, the LLDP join packet sent out by the PE will also include configuration information for these LAGs (e.g., identities of the PE's LAGs and the member cascade ports of each LAG).

Upon receiving these LLDP join packets, the CB can perform various checks to ensure that the joining PE can be properly integrated into the extended bridge. In cases where the LLDP join packets include PE LAG configuration information, these checks can include specific validations for verifying the topology of the bridge in view of the PE's configured LAG connections. If the topology validation fails, the CB can place one or more of the ports of the joining PE into a disabled state and can generate an error message/log for the system's users. Alternatively, if the topology validation is successful, the CB can proceed with integrating the joining PE in accordance with the PE configuration information in the LLDP join packets.

The following is an example list of topology validations that may be performed by the CB at the time of PE join:

Verify that all of the ports that belong to a single LAG on the joining PE connect to a single LAG on an adjacent unit The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
receiving, by a first network device in a system of network devices, a command relating to a change to a link aggregation group (LAG) of the system;
transmitting, by the first network device, change messages to one or more other network devices in the system that are affected by the change, wherein the change messages are transmitted in an order based on distance of each of the one or more other network devices from the first network device, and
subsequently to the transmitting:
adding, on the first network device, a new virtual port for each port removed from the LAG according to the change; and
assigning a new identifier to each new virtual port.

2. The method of claim 1 wherein the command relates to: a deletion of at least one port from the LAG.

3. The method of claim 1 wherein the transmitting comprises:
determining a network device in the one or more other network devices that is furthest downstream from the first network device;
sending a change message to the determined network device; and
receiving an acknowledgement from the determined network device that it has completed programming of its local ports.

4. The method of claim 3 wherein the transmitting further comprises:
repeating the determining, sending, and receiving in a sequential order for remaining network devices in the one or more other network devices.

5. The method of claim of claim 1 where the change messages comprise information usable by the one or more other network devices for programming their local ports in accordance with the change.

6. The method of claim 1 further comprising, prior to transmitting the change messages:
validating the change against one or more tables maintained by the first network device that specify a current port and LAG configuration of the system.

7. The method of claim of claim 6 further comprising, prior to transmitting the change commands:
disabling, in the one or more tables, any ports that are removed from the LAG according to the change.

8. The method of claim of claim 1 further comprising, subsequent to the transmitting:
saving the change in one or more tables maintained by the first network device that specify a current port and LAG configuration of the system.

9. The method of claim 1 further comprising, subsequent to the transmitting:
removing, on the first network device, any virtual ports corresponding to ports added to the LAG according to the change; and
removing identifiers associated with the removed virtual ports.

10. The method of claim of claim 1 wherein the the first network device blocks acceptance of any further commands relating to changes to ports or LAGs of the system until processing of the received command has completed.

11. The method of claim of claim 1 wherein the first network device is a controlling bridge (CB) and wherein the system of network devices is an extended bridge.

12. The method of claim of claim 11 wherein the command relates to a dynamic change to a live cascade link or trunk in the extended bridge.

13. A non-transitory computer readable storage medium having stored thereon program code executable by a first network device in a system of network devices, the program code causing the first network device to:

receive a command relating to a change to a link aggregation group (LAG) of the system;

transmit change messages to one or more other network devices in the system that are affected by the change, wherein the change messages are transmitted in an order based on distance of each of the one or more other network devices from the first network device, and subsequently to the transmitting:

add a new virtual port for each port removed from the LAG according to the change; and assign a new identifier to each new virtual port.

14. The non-transitory computer readable storage medium of claim 13 wherein the transmitting comprises:

determining a network device in the one or more other network devices that is furthest downstream from the first network device;

sending a change message to the determined network device; and receiving an acknowledgement from the determined network device that it has completed programming of its local ports.

15. The non-transitory computer readable storage medium of claim 14 wherein the transmitting further comprises:

repeating the determining, sending, and receiving in a sequential order for remaining network devices in the one or more other network devices.

16. A network device comprising:

a processor; and a non-transitory computer readable medium having stored thereon program code that, when executed by the processor, causes the processor to:

receive a command relating to a change to a link aggregation group (LAG) of the system;

transmit change messages to one or more other network devices in the system that are affected by the change, wherein the change messages are transmitted in an order based on distance of each of the one or more other network devices from the network device, and subsequently to the transmitting:

add a new virtual port for each port removed from the LAG according to the change; and assign a new identifier to each new virtual port.

17. The network device of claim 16 wherein the transmitting comprises:

determining a network device in the one or more other network devices that is furthest downstream from the network device;

sending a change message to the determined network device; and receiving an acknowledgement from the determined network device that it has completed programming of its local ports.

18. The network device of claim 17 wherein the transmitting further comprises:

repeating the determining, sending, and receiving in a sequential order for remaining network devices in the one or more other network devices.

\* \* \* \* \*